United States Patent [19]
Rigault et al.
[11] Patent Number: 4,748,805
[45] Date of Patent: Jun. 7, 1988

[54] GAS TURBINE EXHAUST DEVICE INCLUDING A JET DIFFUSER

[75] Inventors: Jacques Rigault, Brunoy; Pierre Bonnet, Paris, both of France
[73] Assignee: Vibrachoc, Evry Cedex, France

[21] Appl. No.: 807
[22] Filed: Jan. 6, 1987
[30] Foreign Application Priority Data
Dec. 18, 1986 [FR] France ................ 8717760
[51] Int. Cl.⁴ ................ F02C 7/00
[52] U.S. Cl. ................ 60/39.5
[58] Field of Search ......... 60/39.5; 181/213, 215-219, 181/222; 138/39

[56] References Cited

U.S. PATENT DOCUMENTS 3,185,252 5/1965 Lemmerman ................ 181/217
3,195,678 7/1965 Morgan et al. ................ 181/217
3,688,865 9/1972 Smith ................ 181/218
3,692,140 9/1972 Smith ................ 181/213
4,180,141 12/1979 Judd .

*Primary Examiner*—Louis J. Casaregola
*Attorney, Agent, or Firm*—Sughrue, Mion, Zinn, Macpeak & Seas

[57] ABSTRACT

A gas turbine exhaust device installed at the outlet from the guide vane stage (5) of the turbine and upstream from an exhaust duct (10), said device comprising a jet diffuser (20) having orifices (25) perforated therethrough, with the axis of the diffuser being the same as the axis of the turbine.

1 Claim, 2 Drawing Sheets

GAS TURBINE EXHAUST DEVICE INCLUDING A JET DIFFUSER

The present invention relates to a gas turbine exhaust device for fitting at the outlet from the guide vane stage of the turbine, upstream from its exhaust duct.

BACKGROUND OF THE INVENTION

Present exhaust devices for mounting at the outlet of the guide vane stage of a gas turbine upstream from its exhaust duct are constituted by a cone whose opening is terminated by a series of concentric deflector blades.

This arrangement cannot completely deflect the exhaust gas which therefore takes up a privileged direction lying at about 50° on either side of the axis. In addition, given the real outlet cross-section, the exhaust speeds are high and nonuniform, with speeds which may differ by a factor of more than two. Further, the very shape of the vanes, in addition to being difficult to make and difficult to make mechanically strong enough, gives rise to local speed excesses which generate considerable aerodynamic turbulence. Such exhaust gases are therefore taken up into a silencer exhaust duct for attenuating the noise they produce under poor aerodynamic conditions. It is not possible to obtain a uniform field of speeds in the inlet gas to the silencer exhaust duct, thereby giving rise firstly to a poor feed to the air paths and thus to poor acoustic efficiency in the silencer exhaust duct, and secondly to the formation of aerodynamic turbulence which generates low frequency noise and vibration that is very difficult to attenuate and may even give rise to damage to the apparatus.

The aim of the present invention is to provide a turbine outlet with a uniform distribution of gas flow, with exhaust speeds that are well distributed and reduced, with a reduction in major turbulence, and with a reduction in noise level.

SUMMARY OF THE INVENTION

This aim is achieved by replacing the cone and its vanes by a jet diffuser.

More particularly the present invention provides a gas turbine exhaust device installed at the outlet from the guide vane stage of the turbine and upstream from an exhaust duct, said device comprising a jet diffuser having orifices perforated therethrough, with the axis of the diffuser being the same as the axis of the turbine.

BRIEF DESCRIPTION OF THE DRAWINGS

An embodiment of the invention is described by way of example with reference to accompanying drawings, in which.

MORE DETAILED DESCRIPTION

Figure 1:
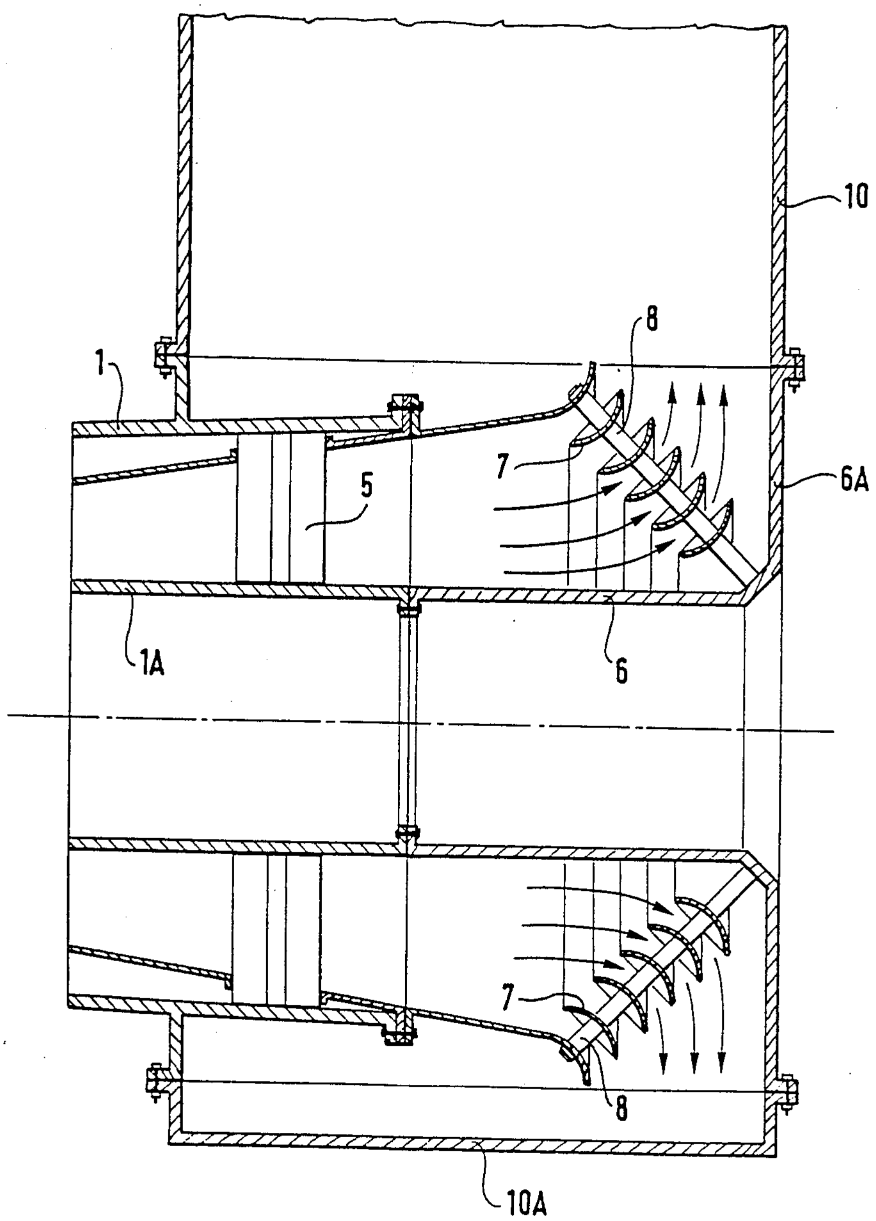
FIG. 1 is a diagrammatic axial section through a prior art exhaust device.

In FIG. 1, the exhaust duct 10 surrounds the end of an exhaust tube 1 from a gas turbine. Another tube 1A of said turbine serves to pass a transmission shaft, and guide vanes 5 are installed in the gas path between the tube 1 and the tube 1A.

The tube 1A is extended by a further tube 6 whose end 6A is connected to the duct 10. In the bend formed between the tube and its end 6A there is a set of vanes 7 extending around the entire periphery of the tube.

Such vanes may be called "tulips". These vanes are mounted in cascade on bars 8. The hot gases leaving the guide vanes 5 are deflected by the vanes 8 and are directed directly into the duct 10.

In this case, gas is ejected solely in directions which are estimated to lie within a cone of about 50°.

Figure 2:
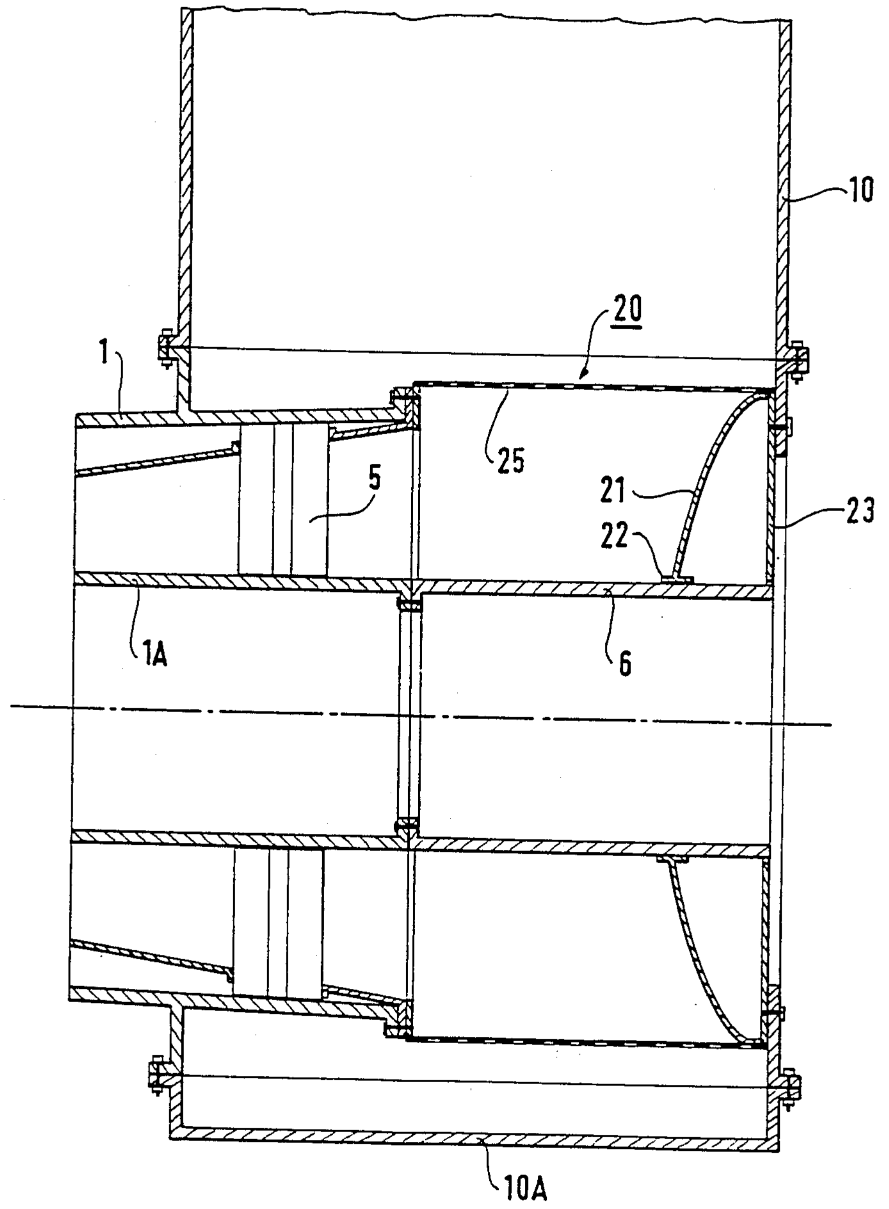
FIG. 2 is a similar view to FIG. 1, but through an exhaust device in accordance with the invention.

In FIG. 2, the vanes 7 and the bars 8 have been omitted and they are replaced by an annular jet diffuser 20 (also known as a "basket" diffuser) which is mounted on the exhaust tube 1. The cylindrical, or optionally conical, tubular perforated plate constituting the diffuser is closed by a shaped annular end piece 21 including a sleeve 22 which fits on the tube 6. The annular shape of the perforated plate passes the transmission shaft of a single shaft turbine, and in this case the downstream end of the perforated plate is closed by a ring 23.

If the turbine has two shafts, neither of them passes through the perforated plate and the ring 23 may be replaced by a solid disk.

The perforated plate has orifices 25 and the diameters of the orifices and the perforation density of the plate are defined as a function of the characteristics of the turbine.

The orifices 25 are distributed over the entire circumference of the plate and project the gas in the form of a multitude of jets around the plate, thereby providing uniform annular flow at constant ejection speed in all radial directions perpendicular to the exit plane. Under these conditions, the entire gas ejection area, i.e. the entire area of the perforated plate, has a flow of gas from the turbine passing therethrough. As a consequence, the ejection speeds are much lower and the exhaust duct placed downstream is fed properly without local speed excesses and without streamlines coming unstuck, thereby providing better efficiency.

Naturally, these orifices need not be distributed over the entire circumference of the perforated plate, but may exist solely in a major portion thereof.

The diameters of the orifices may advantageously differ depending on their positions along the axis of the plate.

Thus, the perforations may be of the "logarithmic" type when going from one end to the other of the plate in order to take account of gas dynamic pressure, end effects, residual thrust, and any natural rotation of the jet.

Such logarithmic perforation as adapted to each type of turbine is essentially constituted (along a generator line) as follows:

a varying perforation rate; and orifices of different cross-section when running from the outlet from the turbine to the end of the perforated plate, with the larger diameter orifices being closer to the turbine.

As a result, the exhaust gases from the turbine leave the the perforated plate at a more uniform speed, have reduced turbulence due to the diffusing effects of the plate, and have attenuated levels of sound and vibration due to the filter effect.

We claim:

1. A gas turbine exhaust device for a gas turbine having an exhaust tube concentrically surrounding and spaced from a second tube and defining with said second tube an exhaust gas passage, a guide vane stage within said exhaust gas passage leading to an exhaust duct downstream therefrom, said exhaust gas device being installed at the outlet from the guide vane stage of the turbine and upstream from the exhaust duct, said device comprising a jet diffuser in the form of a tubular plate having orifices perforated therethrough, said orifices opening into said exhaust duct and the axis of the diffuser tubular plate being coaxial to the axis of the turbine, the cross-sectional area of the orifices within the tubular plate varying longitudinally along a generator line of the diffuser tubular plate, with the area falling off with increasing distance from the outlet from the turbine, and wherein the cross-sectional area of the orifices varies in a logarithmic manner along said generator line.

* * * * *